United States Patent
Piett et al.

(10) Patent No.: US 10,341,494 B2
(45) Date of Patent: Jul. 2, 2019

(54) EMERGENCY RESPONSE DATA MANAGEMENT

(75) Inventors: William Todd Piett, Southborough, MA (US); Matthew A. Serra, Morristown, NJ (US)

(73) Assignee: RAVE WIRLESS, INC., Framingham, MA (US)

( * ) Notice: Subject to any disclaimer, the term of this patent is extended or adjusted under 35 U.S.C. 154(b) by 0 days.

(21) Appl. No.: 13/441,148

(22) Filed: Apr. 6, 2012

(65) Prior Publication Data

US 2012/0257729 A1    Oct. 11, 2012

Related U.S. Application Data

(60) Provisional application No. 61/473,368, filed on Apr. 8, 2011.

(51) Int. Cl.
*H04M 11/04* (2006.01)

(52) U.S. Cl.
CPC ................. *H04M 11/04* (2013.01)

(58) Field of Classification Search
USPC ..................................... 379/37–45
See application file for complete search history.

(56) References Cited

U.S. PATENT DOCUMENTS

| | | | | |
|---|---|---|---|---|
| 5,986,568 A * | 11/1999 | Suzuki | ........... | G06F 19/3418 340/9.1 |
| 6,693,530 B1 * | 2/2004 | Dowens | ........... | G08B 13/22 340/506 |
| 8,441,356 B1 * | 5/2013 | Tedesco | ........... | G08B 21/0453 340/539.15 |
| 2002/0027975 A1 * | 3/2002 | Oxley | ........... | H04M 3/42 379/45 |
| 2002/0067803 A1 * | 6/2002 | Antonucci | ........... | H04M 11/04 379/45 |
| 2003/0012344 A1 * | 1/2003 | Agarwal | ........... | H04M 11/04 379/37 |
| 2003/0091159 A1 * | 5/2003 | Oxley | ........... | H04M 3/42 379/38 |
| 2004/0008125 A1 * | 1/2004 | Aratow | ........... | G06Q 50/265 340/870.07 |
| 2005/0141676 A1 * | 6/2005 | Andrew | ........... | G06Q 10/10 379/45 |
| 2005/0157853 A1 * | 7/2005 | Andrew | ........... | G06Q 10/10 379/42 |
| 2008/0031546 A1 * | 2/2008 | Yamada | ........... | G06K 9/2054 382/305 |
| 2008/0088428 A1 | 4/2008 | Pitre et al. | | |
| 2009/0067584 A1 * | 3/2009 | Waters | ........... | H04W 76/50 379/45 |
| 2009/0070146 A1 * | 3/2009 | Haider | ........... | G06Q 10/00 705/3 |
| 2010/0262668 A1 | 10/2010 | Piett et al. | | |

\* cited by examiner

*Primary Examiner* — Maria El-Zoobi
(74) *Attorney, Agent, or Firm* — Occhiuti & Rohlicek LLP

(57) ABSTRACT

An approach to managing emergency response data for providing in response to an emergency call makes use of different management approaches depending on the source of the data. For example, data provided directly by the individual to whom the data refers may be handled in one way, while data provided indirectly by an entity or other individual may be handled in another way. Information provided indirectly may be validated and/or its source indicated when presented to an emergency responder.

28 Claims, 1 Drawing Sheet

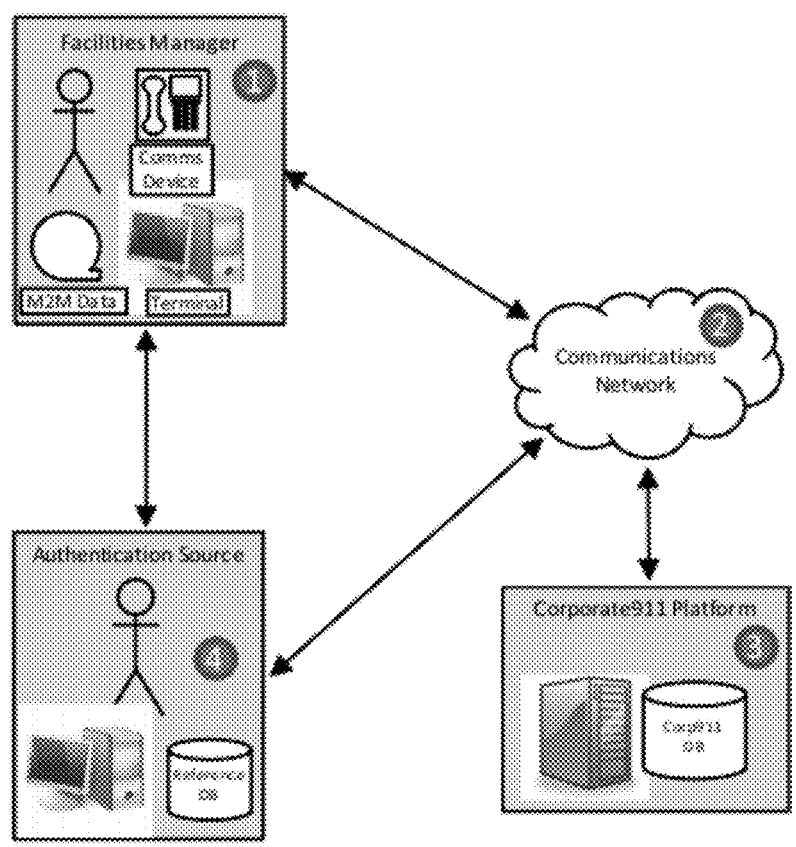

EMERGENCY RESPONSE DATA MANAGEMENT

CROSS-REFERENCE TO RELATED APPLICATIONS

This application claims the benefit of U.S. Provisional Application No. 61/473,368 filed Apr. 8, 2011, which is incorporated herein by reference.

BACKGROUND

This invention relates to management of emergency response data, and in particular, entry and/or management of emergency response data from a source of information, for instance, an individual or entity, on behalf of another individual or individual call source.

About 250 million 9-1-1 calls are made each year in the United States. In many cases, these calls are originated from communications devices not under the control of the person placing the request for assistance (e.g. a corporate office line). In other circumstances, the call may be originated from a location managed by someone other than the caller (e.g., a call from a mobile phone placed from within a large office building). In still other circumstances, the individual placing the request for emergency service may be placing this call on behalf of another individual. In these cases, it is not always feasible for the caller to manage the emergency response information (or equivalently emergency response data representing such information) associated with the communications device or location originating the call.

Approaches to providing emergency response data to emergency responders have been proposed and deployed. For example, an approach to providing emergency response data is described in US Pat. Pub. 2010/0262668A1, "Emergency Information Service" (Oct. 14, 2010), which is incorporated by reference, and commercially deployed as the "Smart911" system by Rave Wireless, Inc. Generally, these approaches support an individual providing emergency information which is made available when that individual makes an emergency call, for example, by being made available to an operator answering the emergency call at a Public Safety Answering Point (PSAP) and forwarded to the first responders to the emergency.

SUMMARY

Generally, there is a need to manage emergency response data for delivery to an emergency operator (e.g., an operator at a PSAP) and/or a first responder to an emergency call, without requiring that the individual making the call has himself or herself previously provided the data. Such management of emergency response data on behalf of an individual has application in a number of scenarios, including in corporate offices in which calls may come from employees in which case a department of the corporation may be responsible for providing the emergency information, and in personal care situations in which an individual such as a nurse may be caring for another individual and may provide the emergency information on their behalf.

For example, emergency assistance provided in response to an employee calling from a corporate-assigned device could benefit from information best managed by the property-manager, such as a building floor plan, facilities access information, facilities manager contact information, hazardous materials on-site, etc. In other situations, the caller may be calling on behalf of someone under their care. For example, the residents of a nursing home would benefit from having information about themselves available to first responders in the event an administrator of that facility places a request for emergency service on their behalf. As a related example, in a visiting nurse scenario, the visiting nurse may provide emergency response information on behalf of the individuals for whom the nurse cares in much the same way as a nursing home entity provides information about the residents of the home.

Furthermore value is provided by providing facilities to confirm a user's ownership of Emergency Response Information, to facilitate simplified provisioning and maintenance of said information, and to make this information available to emergency services call takers, dispatchers, and first responders where appropriate while maintaining the user's privacy.

In one general aspect, an approach to managing emergency response data for providing in response to an emergency call makes use of different management approaches depending on the source of the data. For example, data provided directly by the individual to whom the data refers may be handled in one way, while data provided indirectly by an entity or other individual may be handled in another way. That other way may involve validation of the data before the emergency call. That other way may involve presentation of the data with an indication of the source of the data and/or nature of validation of the data.

An advantage of this general aspect is that more data can be collected and made available for emergency responders, without requiring that each individual provides his or her own information, while at the same time maintaining validity of the information and a record and presentation of the source of the information so that consumer of the information can make best use of the information.

In another aspect, in general, a method is directed to providing emergency response information associated with an individual emergency call source of a plurality of emergency call sources. First emergency response information associated with the individual call source is accepted from a first information source other than an individual directly corresponding to the individual call source. This first emergency response information is validated, and then maintained for providing in association with an emergency call from the individual call source.

In another aspect, in general, a method is directed to providing emergency response information associated with an individual emergency call source of a plurality of emergency call sources. Emergency response information is maintained associated with the individual call source from a plurality of information sources. Prior to an emergency call from the individual emergency call source, emergency response information associated with the individual call source is accepted from one or more sources or the plurality of information sources other than an individual directly corresponding to the individual call source. The maintained emergency response information is then provided for response to an emergency call from the individual emergency call source. A source of at least some of the emergency response information is provided with the information.

Aspects can include one or more of the following features.

The individual call source is an individual.

The individual call source is a specific communication source, for instance a telephone device, or a set of telephone devices associated with a common telephone number.

The first information source comprises an entity associated with the individual call source. For instance, the entity may be an employer of an individual or responsible for an individual's telephone device.

The first information source comprises a first person associated with individual call source. For instance, the first person comprises a caregiver of an individual represented by the individual call source.

The first information source comprises an automated information source. For instance, information may be provided in a machine-to-machine interaction.

Second emergency response information associated with the individual call source is accepted from the individual directly corresponding to the individual call source.

The second emergency response information is maintained for providing in conjunction with the first emergency response information in association with an emergency call from the individual call source.

The maintained emergency response information is presented to a responder to the emergency call from the individual call source.

Maintaining the emergency response information comprises maintaining parts of the emergency response information in separated systems Providing the maintained emergency response information comprises providing references to the parts of the information.

Providing the maintained emergency response information includes providing validation information in association with the emergency response information.

Other features and advantages of the invention are apparent from the following description, and from the claims.

DESCRIPTION OF DRAWINGS

FIG. 1 is a block diagram of an Emergency Response Information management system.

DESCRIPTION

One of example of management of emergency response information relates to information provided and maintained by a corporate facility on behalf of employees at that facility. It should be understood that this is only one example, and the process described is equally applicable to management of emergency response information by subsets of individuals or institutions to manage emergency response information for a subset of the population, or for the properties under their management.

In some implementations, the system permits data that may have been provided (or not) by individuals to be augmented and made available to first responders by allowing institutions to manage Emergency Response Information on behalf of their facilities, and those who visit, work at, or dwell within these facilities. This Emergency Response Information is made available through a database (either national or regional) or by providing an easy method for dynamically referencing data in multiple databases. Emergency Response Information can then be accessed by PSAPs or other emergency responders based on a caller's phone number or other unique identifier (e.g. instant messenger ID). The data returned by this query allows the first responder to retrieve information associated with the facility, communications device, individual placing the call, or an individual for whom the caller is calling on behalf of.

In one implementation a system (referred to in this description as the "Corporate911" system) has three components, which can be deployed as separate components or in conjunction with each other:

A component for collecting Emergency Response Information associated with a facility, and maintaining this information over time.

A component for determining the validity of the provided Emergency Response Information, and to confirm the individual or entity providing the data is authorized to do so.

A component for processing and responding to requests for institution-managed Emergency Response Information.

Data is collected through subscriber facing computer interfaces, as well as data sourced by third parties. The above information will be associated with the individual or institution providing the information, the address or geographic position of the facilities being registered, and/or the communications devices associated with the facilities.

As an example, the information registered with Corporate911 for the facility may include or reference any one, or more, of the following types of information:

Facility description
Facility construction
Diagrams of the facility and associated structures
Contacts for the facility
Descriptions of how to access the facility
Hazardous materials on site
Information about the tenants or residents of the facility
Any other information relevant to responding to an incident within the facility This information can be provided and maintained through a human-to-machine interface (e.g. a computer application, web browser, IVR, etc), or via a machine-to-machine interface to facilitate higher volume and/or higher frequency updates (via the sharing of files, web services, or other computer-to-computer API's).

The value of Emergency Response Data when addressing an incident can be directly correlated to the validity and accuracy of the Emergency Response Information provided. One component of validating this information is to confirm the identity of the individual or institution providing this information. The Corporate911 system calls for the implementation of one or more of the following approaches:

Allowing the individual to establish an account with Corporate911, and require a third party to confirm the identity of the registrant, and the registrant's authority to represent the properties and/or users being registered.

Requiring a Corporate911 registrant to provide information which would only be known to the entity responsible for managing the facility (such as a unique account number, secret phrase, PIN code, etc).

Requiring the registrant to validate the Corporate911 account by interacting with Corporate911 system through a means of communication known to be associated with the facility or registrant.

A second component of validating Corporate911 Emergency Response Information is to "join" or "merge" the information under their scope-of-control with information provided by other sources for the same communications method or geographic location. An example of such validation would be to associate medical conditions separately provided by an employee or other individual with corporate emergency response information provided for the same device and/or caller location. By recognizing cases where two data sources (user and facility) claim affiliation with the same identifier, business rules can be put in place to confirm ownership overlap or rectify a discrepancy. Examples of such processes are:

Communicating to one or both parties that their information is in contention. Providing resolution tools, such as an IVR, web, or text-message based interface to prove ownership of the communications method.

Allowing for overlap in ownership, such that each entity is allowed to manage a portion of the data set (for example, the individual is allowed to manage their medical conditions and emergency contacts, whereas a facilities manager is allowed to manage the details related to the structure an property associated with the communications method).

Visually (or otherwise perceptually) differentiating sources of emergency response data when it is presented (e.g., graphically rendered) to public safety responders When a request for assistance is placed to an emergency response organization, the information made available to the emergency responders typically relies on a one-to-one correlation between the caller, and the Emergency Response Information associated with a caller (such Additional Location Information, known as ALI). Such static and narrow relationships may not be sufficient where complex relationships between individuals, tenants (e.g. employers), and facilities managers exist. Furthermore, given the limitations of some communications technologies, it may only be possible to relate a request for assistance with high-level information. This is particularly true with some Multi Line Telephone Systems (MLTS), where the calling number can identify the property or tenant, but is not unique enough to identify a specific structure, caller or the communications device placing the call.

The Corporate911 system addresses this consideration making available all Emergency Response Information associated with all individuals and aspects of the facility, tenants, and occupants to the emergency response entities when a request for assistance is placed from any one communications method associated with a particular address or facility.

Furthermore, due to the more complex operational environment of such facilities, it may be important and valuable to gain access to the Emergency Response Information associated with a property outside of a traditional request for assistance (e.g. a call placed to 911). Examples of such situations are:

Cases where on-site response resources respond to an incident, such that the incident is not communicated through a traditional request for assistance (e.g. dialing 9-1-1).

Cases where emergency response plans must be assembled and referenced in preparation for various contingencies.

Cases where Emergency Response Information is referenced for training, mock disaster recovery drills, etc.

Cases where an incident (such as a forest fire) threatens adjacent occupants or facilities, such that the emergency response organization can benefit from knowing which facilities, tenants, or occupants meet specific criteria (such as distance from the event, presence of hazardous materials, presence of occupants at risk (e.g. mobility impaired individuals) thereby allowing the emergency responders take mitigating action.

The Corporate911 system addresses these challenges by providing the reporting tools necessary to extract Emergency Response Data to address these scenarios while providing the necessary permissions levels to ensure only authorized individuals see the information The following example use case shows the work flows that may be used with the Corporate911 system. A first example work flow related to corporate data registration with manual validation as follows:

A Facilities Manager (1) charged with providing the institutions Emergency Response Information uses a computer to access a shared Communications Network (2) and establish an account within the Corporate911 Platform (3).

The Facilities manager (1) augments their Corporate911 profile by providing the institution's relevant Emergency Response Information to the Corporate911 Platform (3) via the shared Communications Network (2). This information may be provided manually via a computer terminal interface, or provided en-masse via a machine-to-machine (M2M) interface.

At this time, the facilities Corporate911 account can be placed in a "pending" state with the Corporate911 platform (3), denoting that the created Emergency Response Information must be validated as having been provided by legitimate data source.

The Authentication Source (4) must evaluate the newly created Corporate911 account. The Authentication Source can be any entity who is in the position to determine if the individual maintaining the facilities Corporate911 account (1) is authorized to do so. This research can include evaluating the data entered into Corporate911 database, or by contacting the individual who created the Corporate911 account directly.

Upon completion of their research, the Authentication Source (4) will update the Corporate911 Platform (3) to either indicate the facilities profile has been provided by an authorized agent of the facility, or will flag the account as improperly sourced.

In an alternate embodiment, the Authentication Source (4) accesses the Corporate911 Platform (3) via the shared Communications Network (2), and creates a Corporate911 account on behalf of the Facilities Manager (1). The Authentication Source (4), then provides a recognized Facilities Manager (1) with the means to access this newly created account. The Facilities Manager (1) then accesses the Corporate911 platform (3) via the shared Communications Network (2) to add the facilities Emergency Response Information to their pre-validated Corporate911 account.

Another example use work flow related to corporate data registration with code-based validation:

A Facilities Manager (1) charged with providing the institution's Emergency Response Information uses a computer to access a shared Communications Network (2) and establish an account within the Corporate911 Platform (3).

The Facilities manager (1) augments their Corporate911 profile by providing the institution's relevant Emergency Response Information to the Corporate911 database (3) via the shared Communications Network (2). This information may be provided manually via a computer terminal interface, or provided en-masse via a machine-to-machine (M2M) interface.

At this time, the facilities Corporate911 account can be placed in a "pending" state, denoting that the created Emergency Response Information must be validated as having been provided by a legitimate data source.

The Authentication Source (4) provides the Facilities Manager (1) with a unique code. This code is associated with the facility(ies) under the Facility Manager's control. The Facility Manager (1) provides this code to the Corporate911 platform over the shared Communications Network (2). If the correct code has been received, the Corporate911 Platform (3) updates the account as "valid".

The unique code provided by the Authentication Source (4) can be provided to the Facilities Manager (1) via any means trusted by both parties (traditional mail, voice communications, etc). Furthermore, this unique code can be provided to the Facilities Manager (1) prior to the Facilities Manager creating their Corporate911 account (as an alternative to after Corporate911 account creation, as outlined above).

A third example use work flow relates to corporate data registration with communication based validation.

A Facilities Manager (1) charged with providing the institutions Emergency Response Information uses a computer to access a shared Communications Network (2) and establish an account within the Corporate911 Platform (3).

The Facilities manager (1) augments their Corporate911 profile by providing the institution's relevant Emergency Response Information to the Corporate911 Platform (3) via the shared Communications Network (2). This information may be provided manually via a computer terminal interface, or provided en-masse via a machine-to-machine (M2M) interface. The Emergency Response Information includes at least one communications device.

Data sharing between the Corporate911 Platform (3) and an Authentication Source (4) identifies communications methods which are known to be associated with a particular facility. For example, communication provider records can identify a communication service known to be associated with the Facilities Manager (1).

A message is sent either by, or to, the communications device associated with the facility. Interacting through this call (e.g., via a text message or IVR key-presses, or other interface supported by the communication device) can allow the Facilities Manager (1) to acknowledge the registration activity with the Corporate911 platform.

The Corporate911 Platform (3) updates the account as "valid".

As introduced above, the Corporate911 system is only one example of the more general approach introduced in this document. In other non-exhaustive examples, emergency information may be provided by one or more of the following:

A nursing home (i.e., an authorized user acting on behalf of the nursing home) provides information on behalf of its residents;

A visiting nurse or other medical practitioner provides information on behalf of cared-for patients;

A school provides information on behalf of its teachers students. In some examples, the school can make use of information about specific classrooms to provide information (which may be time-varying) about the students in a classroom associated with a phone in that classroom; and A family member can provide information about other family member.

In some examples, the emergency response data is provided in response to self-describing surveys that solicit information from community members. For examples, a survey approach can be used, as described in U.S. Provisional Application 61/595,286, titled "PERSONALIZED SURVEY SYSTEM," filed on Feb. 6, 2012, which is incorporated by reference. More generally, the approaches for collection and/or use of emergency response data described in the co-pending application can be combined with the approaches described above.

As an example, the information collected and managed using approaches described above may be made available (as an alternative or as an adjunct) in situations other than emergency calls. For example, geographically-based queries or graphical displays can access both information provided by individuals, as well as information provided by entities and other individuals on behalf of that individual. This feature may be valuable, as a use case example, in determining if there are disabled individuals in an area, but those individuals needed a visiting nurse to provide their disability information because the individuals could not provide the information directly. As another example, survey collection of information as introduced in the co-pending application is used to collect the emergency response data, but rather than providing the surveys to individuals who provide self-describing information, the surveys are provided to third party individuals (e.g., caregivers) or entities (e.g., employers) who provide information on behalf of the individual. As also introduced in the co-pending application, such information can be associated with permissions for access to the information, for example, limiting the information to certain classes of emergency situations.

In some examples, there may be multiple entities that provide emergency response data associated with an individual or communication device. In some examples, the multiple entities may be hierarchical, for example, with an individual providing the most detailed information, a corporate department providing a next level of data, and corporation as a whole providing a highest level of information. In other examples, the multiple entities or groups providing information for an individual or communication device may be unrelated and/or overlapping. For example, information provided in association with a user's cellphone number may be provided by an employer, a sports club to which the user belongs, as well as a medical group that provides health care services to the user.

It should be understood that the examples of validation provided above are not exhaustive. For example, in some examples, the user can access the emergency response information and edit, reject and/or annotate information provided by others on the user's behalf. Similarly, other entities, who do not themselves provide information, may be responsible for auditing information or changes to information to confirm its accuracy.

In some examples in which multiple databases are linked to provide aggregated or combined information to an emergency responder, the multiple databases may be maintained or controlled by different entities. In some examples, the individual can control which such related databases can provide information on the individual's behalf in an emergency, while in other examples, the information would be provided without necessarily requiring the individual's permission. In some examples yet other information (e.g., automatically updated map, current building occupancy information, factory status, chemical inventory, etc.) is linked to be provided on behalf of a user without having been specifically provided for that purpose.

Implementations of the systems described above generally make use of software, which includes instructions (e.g., physical or machine level instructions, programming language statements, etc.) for causing one or more data processing systems to perform the functions described above. The instructions may be tangibly stored on machine readable media (e.g., computer disks). In some examples, the data processing systems are distributed, while in other examples, the functions are performed in a centralized computer system. In some distributed examples, different databases are maintained in separated (e.g., geographically separated) systems, while nevertheless providing an integrated presentation of the combined emergency response information to emergency responders. In some examples, the interfaces for providing information to the system makes use of a client-server approach in which a client application provides the user interface to the user providing the information, and the client application is in contact with a server application that accepts and processes the information. A Web client application is an example of such a client application.

It is to be understood that the foregoing description is intended to illustrate and not to limit the scope of the invention, which is defined by the scope of the appended claims. Other embodiments are within the scope of the following claims.

What is claimed is:

1. A method comprising, in advance of an emergency call being made by an individual call-source, receiving, from a facilities manager, a request to establish an account on a corporate 9-1-1 platform via a shared communications network, in advance of said emergency call, causing said corporate 9-1-1 platform to receive information from said facilities manager through said account, wherein said facilities manager differs from said individual call-source and has used said shared communications network to access said account, wherein said facilities manager has provided said information, which comprises emergency-response information concerning said facility, to said corporate 9-1-1 platform through said account, validating said information, maintaining said validated information at said corporate 9-1-1 platform, and in response to said emergency call being made, causing said corporate 9-1-1 platform to make said validated information available to at least one of an emergency operator and a first responder.

2. The method of claim 1, wherein said information further comprises both medical information and corporate emergency response information, said method further comprising permitting said individual call-source to manage said medical information and permitting said manager to manage said corporate emergency response information.

3. The method of claim 1, wherein maintaining said information comprises associating said information with communications devices associated with a business facility on whose behalf said manager has provided said information.

4. The method of claim 1, wherein maintaining said information comprises maintaining said information through a machine-to-machine interface.

5. The method of claim 1 further comprising, at least in part in response to said emergency call having been made by said individual call-source, making said validated information available to said first responder.

6. The method of claim 1, wherein said account was established by said manager on behalf of a business, wherein validating said information comprises requiring said individual call-source to communicate with a communication device known to be associated with a business that has said account.

7. The method of claim 1, further comprising, at least in part in response to said emergency call having been made by said individual call-source, making said validated information available to said emergency-call operator.

8. The method of claim 1, further comprising, during said emergency call, providing access to a database that leads to said information that was provided by said manager to said corporate 9-1-1 platform.

9. The method of claim 1, wherein maintaining said information comprises maintaining said information through a human-to-machine interface.

10. The method of claim 1, further comprising selecting said information to comprise a description of how to access a facility associated with business on whose behalf said manager has provided said information to said corporate 9-1-1 platform.

11. The method of claim 1, further comprising selecting said manager to be a caregiver of said individual call-source who has provided said information on behalf of said individual call-source.

12. The method of claim 1, further comprising confirming a registrant's authority to represent said individual call-source following receipt of a request therefrom to establish said account.

13. The method of claim 1, further comprising making available information associated with a location from which said individual call-source made said emergency call.

14. The method of claim 1, further comprising making available information associated with a communication device that was used by said individual call-source.

15. The method of claim 1, wherein validating said information comprises confirming that said manager has authority to provide said information on behalf of said individual call-source.

16. The method of claim 1, wherein validating said information comprises confirming that said manager has authority to provide said information on behalf of a particular business entity on whose behalf said manager purports to act.

17. The method of claim 1, wherein maintaining said information comprises associating said information with a geographical location associated with a business facility on whose behalf said manager has provided said information.

18. The method of claim 1, further comprising selecting said manager to be one who has provided said information on behalf of a business having a business facility, wherein said individual call-source originates at said business facility.

19. The method of claim 1, wherein said information comprises a description of hazardous materials at a facility associated with a business on whose behalf said manager has provided said information to said corporate 9-1-1 platform.

20. The method of claim 1, wherein validating said information comprises requiring said manager who provides said information to said corporate 9-1-1 platform to communicate with a communication device that is known to be associated with a business on whose behalf said manager provides said information.

21. The method of claim 1, wherein said information comprises emergency contacts for said facility.

22. The method of claim 1, wherein said information comprises a description of a facility associated with a business on whose behalf said manager has provided said information to said corporate 9-1-1 platform.

23. The method of claim 1, wherein validating said information comprises identifying a discrepancy between information provided by said individual call-source, which is within the individual call source's scope of control and outside said manager's scope of control, and information provided by said manager, which is within said manager's scope of control and outside said individual call source's scope of control.

24. The method of claim 1, wherein maintaining said information comprises maintaining said information using a computer-to-computer API.

25. The method of claim 1, wherein validating said information comprises receiving information that would only be known to said manager.

26. The method of claim 1, wherein said information comprises information about tenants of a facility associated with a business on whose behalf said manager has provided said information to said corporate 9-1-1 platform.

27. The method of claim 1, wherein maintaining said information comprises maintaining said information through a web browser.

28. The method of claim 1, wherein validating said information comprises rejecting information that has been provided by said manager.

* * * * *